G. W. BINGHAM.
MOVING PICTURE CAMERA.
APPLICATION FILED MAR. 24, 1919.
1,318,348. Patented Oct. 14, 1919.
6 SHEETS—SHEET 1.
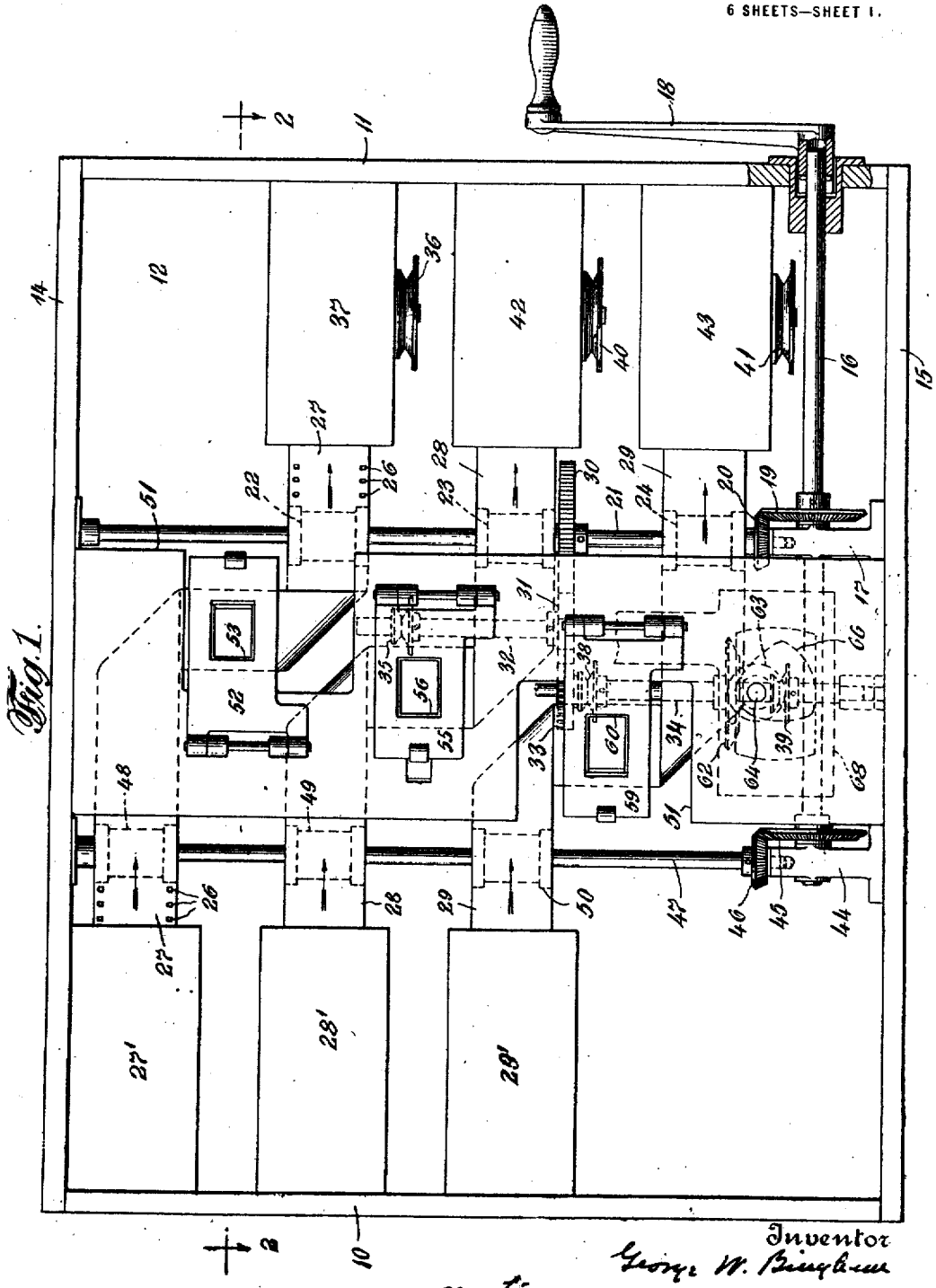
Inventor
George W. Bingham
By his Attorney
Horace Freeman

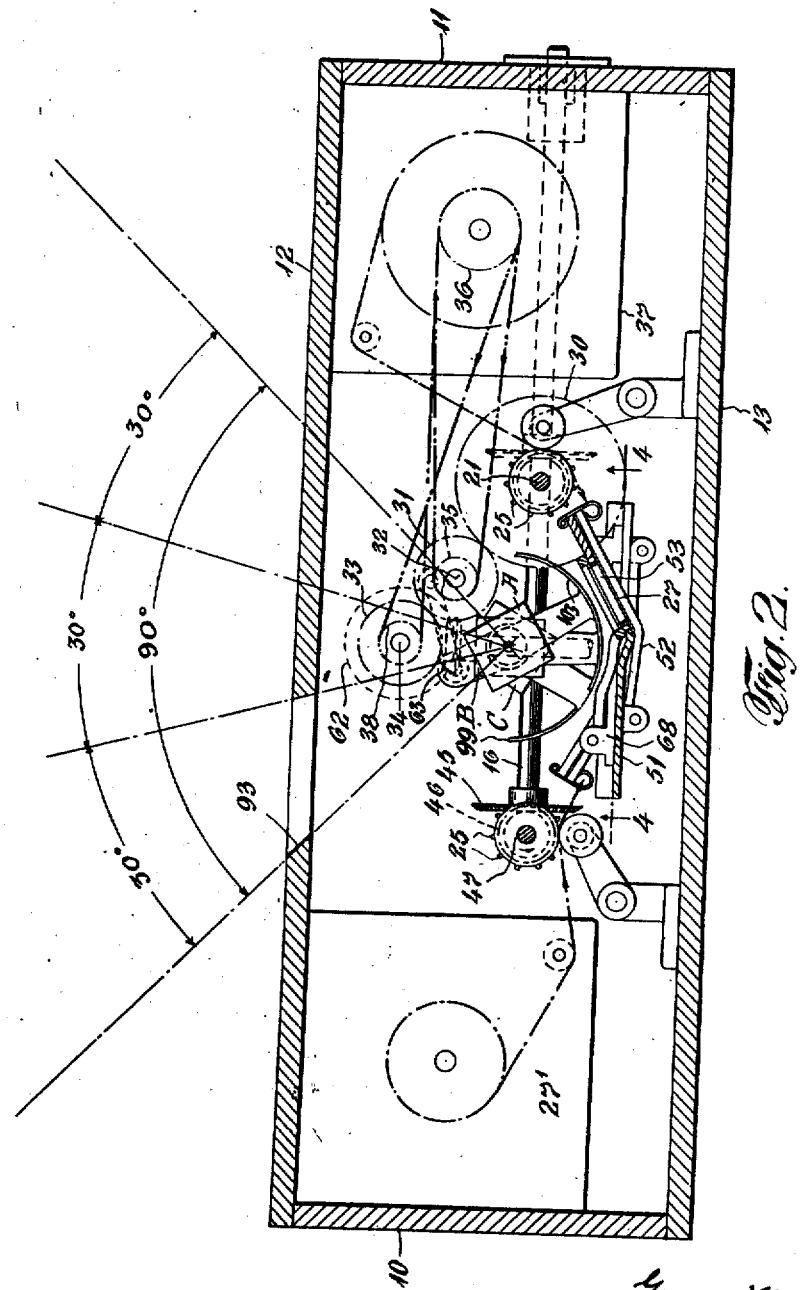

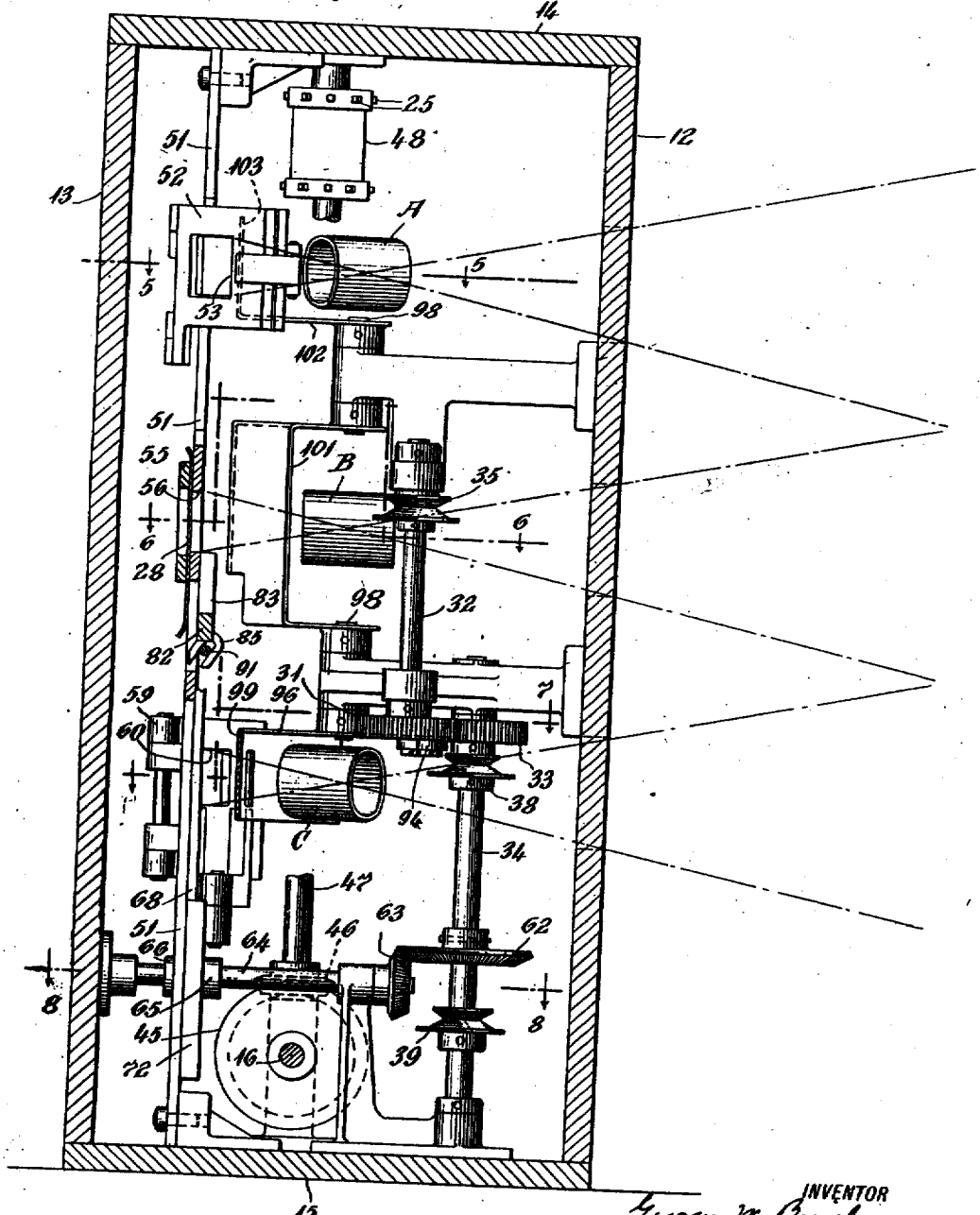

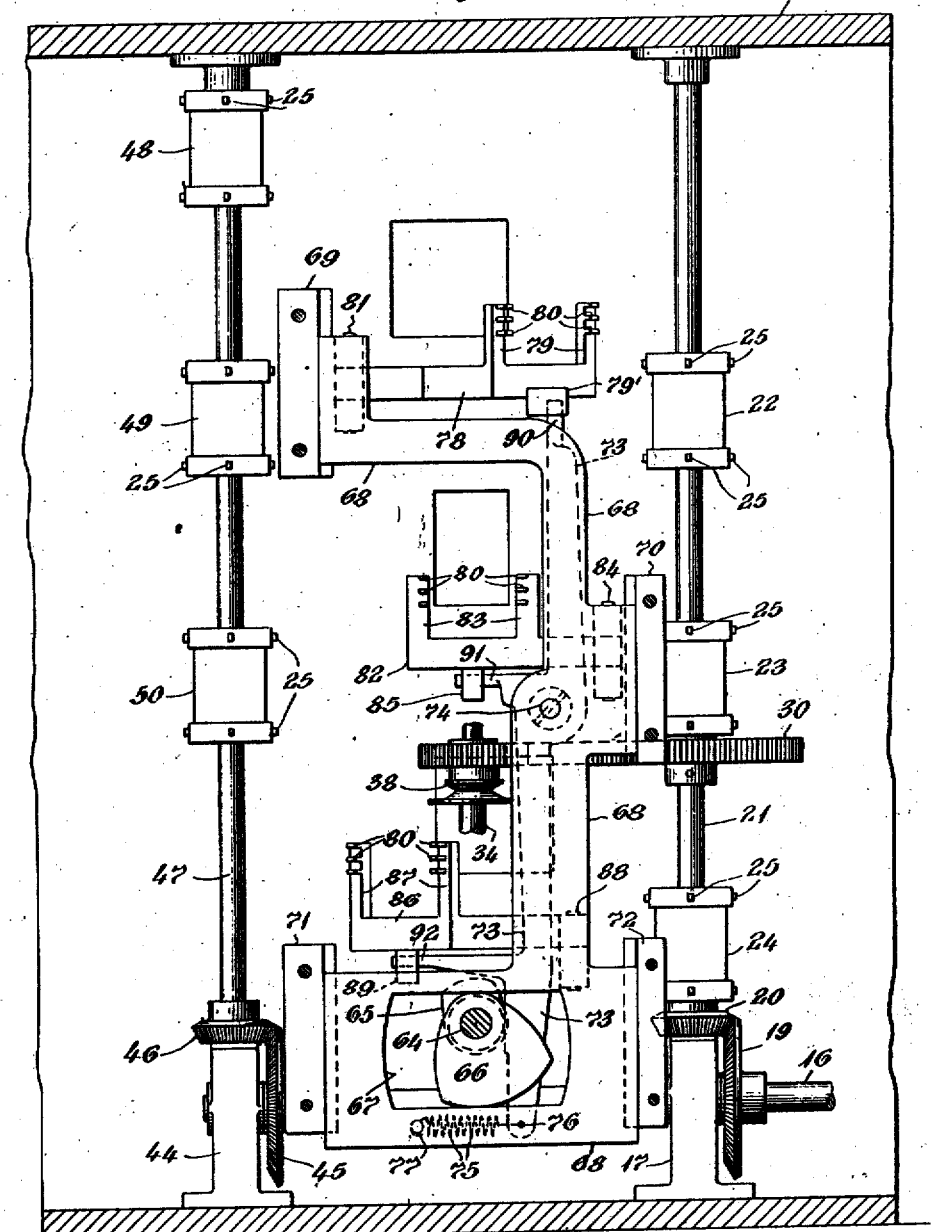

G. W. BINGHAM.
MOVING PICTURE CAMERA.
APPLICATION FILED MAR. 24, 1919.
1,318,348.
Patented Oct. 14, 1919.
6 SHEETS—SHEET 5.
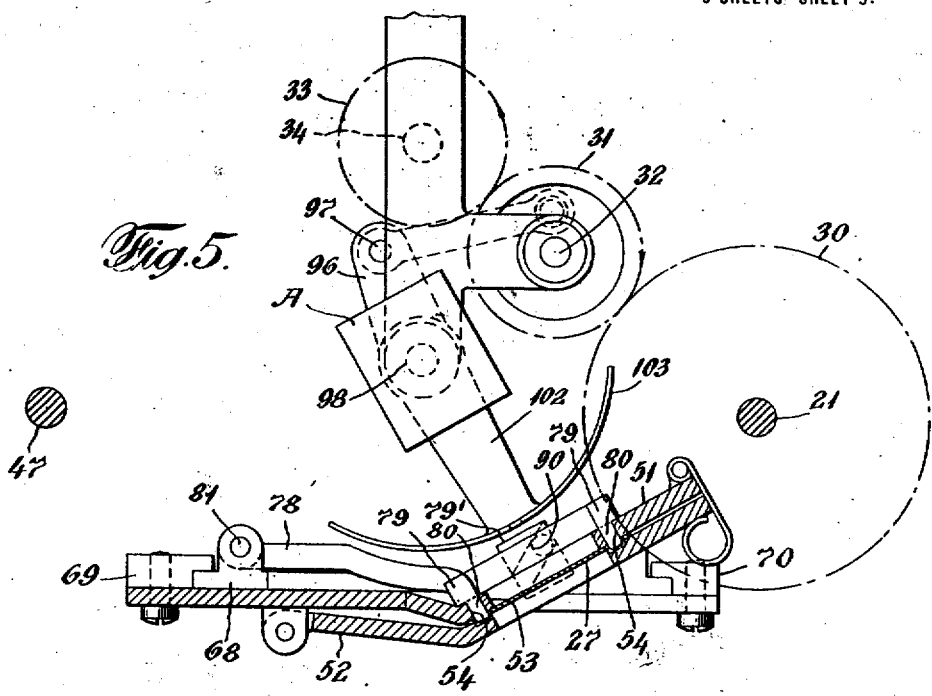
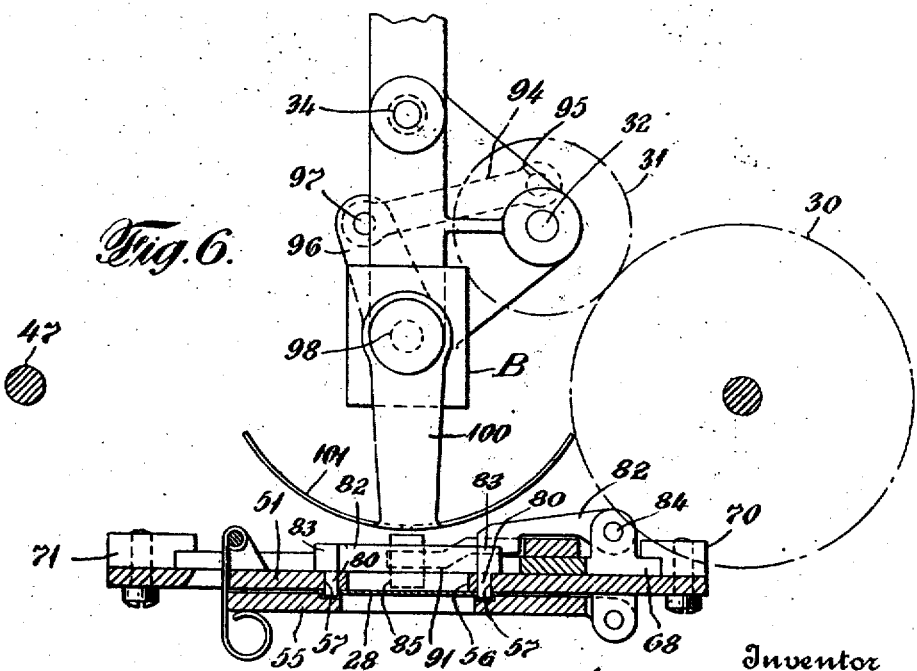
Inventor
George W. Bingham
By his Attorney
Horace Freeman G. W. BINGHAM.
MOVING PICTURE CAMERA.
APPLICATION FILED MAR. 24, 1919.
1,318,348.
Patented Oct. 14, 1919.
6 SHEETS—SHEET 6.
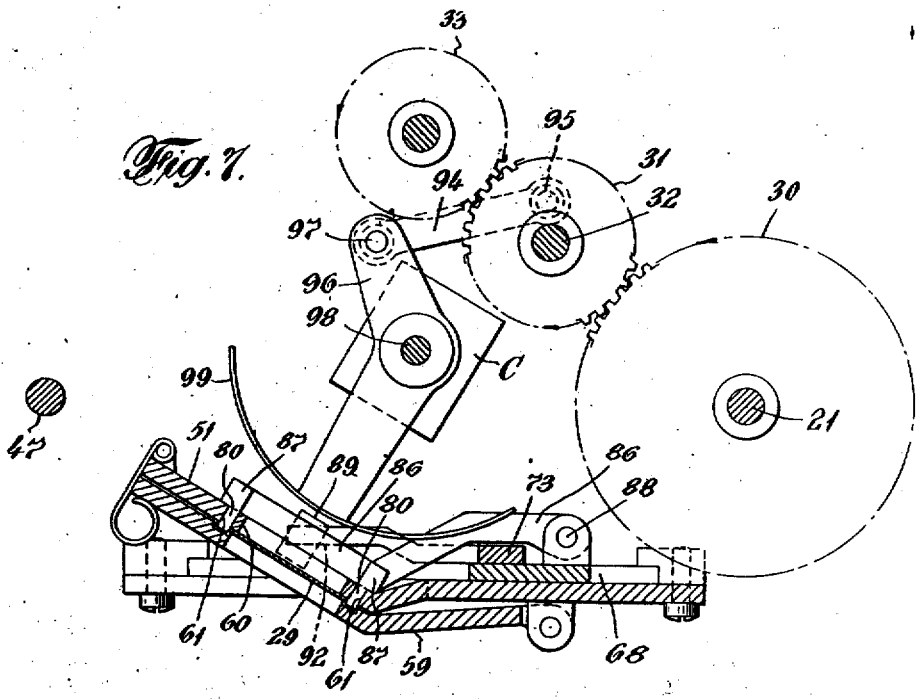
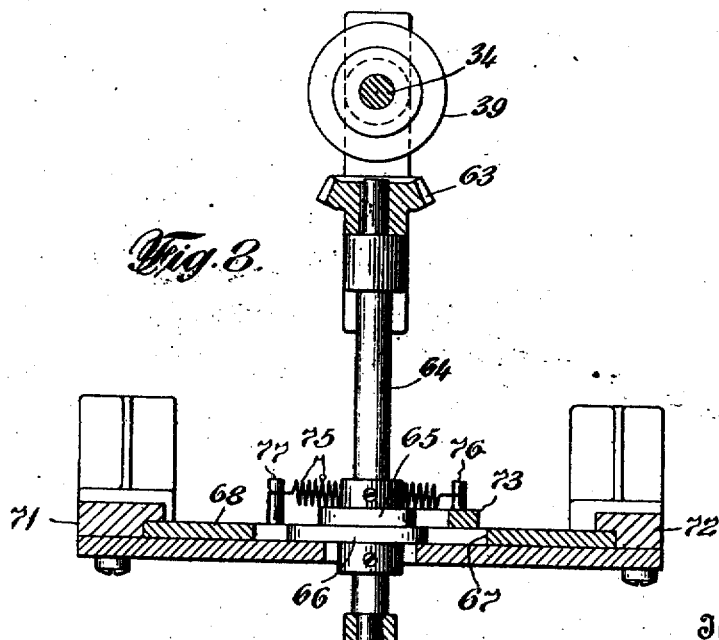

UNITED STATES PATENT OFFICE.

GEORGE W. BINGHAM, OF JERSEY CITY, NEW JERSEY, ASSIGNOR TO THE WIDESCOPE CAMERA CO., A CORPORATION OF NEW JERSEY.

MOVING-PICTURE CAMERA.

1,318,348.  Specification of Letters Patent.  Patented Oct. 14, 1919.

Application filed March 24, 1919. Serial No. 284,732.

*To all whom it may concern:*

Be it known that I, GEORGE W. BINGHAM, a citizen of the United States, residing in Jersey City, county of Hudson, and State of New Jersey, have invented certain new and useful Improvements in Moving-Picture Cameras, of which the following is a full, clear, and exact specification.

My invention relates to moving picture cameras and refers particularly to extended field cameras.

One object of my invention is a camera capable of photographing moving pictures over an extended area of vision.

Another object of my invention is a camera whereby an extended field of vision may be photographed upon a series of films by a series of lenses.

Another object of my invention is a camera whereby a series of moving objects may be photographed simultaneously upon a series of films to produce an extended field view.

Another object of my invention is a camera containing a plurality of photographic films any number of which may be used simultaneously for moving picture photography.

Another object of my invention is a camera whereby a series of moving pictures may be photographed simultaneously upon a series of films in such a manner that each of the films may be used as a picture complete in itself; or the whole series of films, or a portion of them, may be so assembled as to project a wide field view result of the pictures upon the films in combination with each other.

These and other objects of my invention will be evident upon a consideration of my drawings, specification and claims.

In the ordinary moving picture camera but one lens is used, the angle of vision therefore being limited to the angular extent of the lens. This renders it impossible for the camera to have an extended field of vision, unless it is a very considerable distance from the photographical object, a position which it is frequently impossible to obtain, as in photographing moving parades, large assemblages of people, etc.

Various attempts have been made to overcome these difficulties, but none of them has been commercially successful as their use requires special films with the consequent readjustment of all of the standard methods and means of moving picture photography and projection.

The device of my invention accomplishes all of these desired results and in addition presents a number of additional valuable features.

In a broad way, the camera of my invention contains a number of photographic lenses arranged in the same vertical plane with respect to each other and at such angles with respect to each other that each will photograph a different picture upon a film, the series of pictures thus formed being capable of producing a single wide field view.

My camera is also so constructed that all of the lenses, or any number less than the whole, may be employed simultaneously for the taking of photographs, thus allowing the camera to be used as the ordinary one lens camera, or as a combination of cameras taking pictures upon a plurality of films.

My camera is also so arranged that the standard film may be employed, thus allowing the photographic film to be used in the standard projector if desired.

It will therefore, be seen that if my camera contains three lenses, for illustration, three standard film pictures may be simultaneously taken of different objects, each of which may be used alone for projection purposes; or two, or all three, may be employed to produce a projection of a wide field view equal to the sum of the pictures taken and projected. Further, it is not necessary to employ all three lenses, as one or two of them may be rendered inoperative while photographs are taken with the remainder.

My camera therefore, possesses all of the properties of the ordinary one film camera and in addition, many valuable properties not heretofore obtainable in the making of moving pictures.

In the accompanying drawings showing one form of the camera of my invention, similar parts are designated by similar numerals.

Figure 1 is a rear elevation of one form of my device, with camera box rear removed and with parts omitted for clearness and partly in section.

Fig. 2 is a section through the line 2—2 of Fig. 1, partly diagrammatic and with parts removed.

Fig. 3 is a vertical section with parts broken away and removed.

Fig. 4 is a fragmentary enlarged section on line 4—4 of Fig. 2, with parts removed.

Fig. 5 is a detail section on the line 5—5 of Fig. 3.

Fig. 6 is a detail section on the line 6—6 of Fig. 3.

Fig. 7 is a detail section on the line 7—7 of Fig. 3.

Fig. 8 is a detail section on the line 8—8 of Fig. 3.

The particular form of the device of my invention, shown in the accompanying drawings, comprises a camera box having the ends 10 and 11, the front 12, the back 13, the top 14 and the bottom 15.

A revoluble shaft 16, supported by the end 11 of the camera box and the support 17, is capable of being revolved by means of the crank arm 18. The shaft 16 carries a fixedly attached bevel gear 19, meshing with the bevel gear 20 fixedly attached to the revoluble shaft 21. The shaft 21 carries three double sprocket wheels 22, 23, 24, the teeth 25, 25, 25 being capable of insertion within the openings 26, 26, 26 of the three ordinary photographic films 27, 28, 29 respectively.

The shaft 21 carries the fixedly attached gear wheel 30 meshing with the intermediate gear 31, attached to the shaft 32, which in turn meshes with the gear 33 fixedly attached to the shaft 34. The grooved pulley 35, attached to the shaft 32, is attached by means of a suitable straight spring belt, as shown in Fig. 2, to the grooved pulley 36 attached to the shaft of a film winding reel in the film box 37. The grooved pulleys 38 and 39 attached to the shaft 34, are connected by suitable spring-crossed belts, as shown in Fig. 2 with pulleys 40 and 41 respectively, which, in turn, are attached to shafts of film winding reels in the film boxes 42 and 43.

The shaft 16 continues across the camera box and is supported by the support 44 and carries the fixedly attached bevel gear 45 which meshes with the bevel gear 46 fixedly attached to the revoluble shaft 47. The shaft 47 carries three double sprocket wheels 48, 49 and 50, the teeth 25, 25 of which fit within the holes 26, 26 of the three films 27, 28 and 29 respectively and are capable of unwinding the films from feed reels within the boxes 27', 28' and 29'.

The film 27 is capable of being moved between the plate 51 and the hinged door 52, the plate 51 having an opening 53 and two slots 54, 54. The film 28 is capable of being moved between the plate 51 and the hinged door 55, the plate 51 having the opening 56 and the two slots 57, 57. The film 29 is capable of being moved between the plate 51 and the hinged door 59, the plate 51 having the opening 60 and the two slots 61, 61.

The four-way intermittent movement for moving the films 27, 28 and 29 comprises the following:—

The shaft 34 carries the fixedly attached bevel gear 62 meshing with the bevel gear 63 fixedly attached to the shaft 64. Fixedly attached to the shaft 64 is a rock-arm cam 65 and a frame cam 66. The frame cam 66 abuts upon the upper and lower faces of the opening 67 in the frame 68. The frame 68 is capable of slidable movement within recesses 69, 70, 71 within the supporting members 69, 70, 71 and 72. The rotation of the cam 66 will therefore move the frame 68 intermittently upwardly and downwardly. The rock-arm cam 65 abuts upon the lower edge face of the rock-arm 73 pivotally attached at 74. The rock-arm 73 is movable with the frame 68 and a spring 75, attached at 76 to the rock arm and at 77 to the frame, tends to maintain abutment between the rock-arm 73 and the rock-arm cam 65.

A member 78, having the two extended arms 79, 79, with teeth 80, 80 to fit within the holes of a film passed before the film opening 53, is hingedly attached at 81 to the frame 68. The member 78 carries the cam shaped member 79' within which is a runway to be described later.

A member 82, having the two extended arms 83, 83 with teeth 80, 80 to fit within the holes of a film passed before the film opening 56, is hingedly attached at 84 to the frame 68. The member 82 carries the cam shaped member 85, within which is a runway to be described later.

A member 86, having the two extended arms 87, 87 with teeth 80, 80 to fit within the holes of a film passed before the film opening 60, is hingedly attached at 88 to the frame 68. The member 86 carries the cam shaped member 89, within which is a runway to be described later.

The rock-arm has an extended member 90 movable within the run-way of the cam member 79', an extended member 91 movable within the run-way of the cam member 85 and an extended member 92 movable within the run-way of the cam member 89. The position and shape of the run-ways in the cam members 79, 85 and 89 are such that when the rock-arm 78 is moved upon the pivot 74, all of the members 78, 82 and 86 will be alternately moved outwardly to free the teeth 80, 80, 80 from the holes 26, 26 of the films and moved inwardly to engage with said holes.

The intermittent movement of the three films 27, 28 and 29 is therefore accomplished as follows:—

The rotation of the shaft 64 revolves the cams 65 and 66, the cam 66 moving the frame 68 upwardly while the members 78, 82 and 86 are moved through the medium of the cam 65 and free from engagement with the films. As the frame reaches its uppermost position, the cam 65 moves the rock-arm 73 and the armed members 79, 83, 87 of the members 78, 82 and 86 moved inwardly upon the films, the teeth 80, 80 entering the holes of the films, the downward movement of the frame and rock-arm drawing the proper length of film from before the film openings. When the frame reaches its lowest position, the teeth 80, 80 are removed from the film holes 26, 26 and the operation repeated.

Any proper and suitable series of photographic lenses A, B and C are placed in vertical alinement with each other, that is, so that the optical centers of the series of lenses are in vertical position with respect to each other. These lenses A, B and C are placed in front of the film gates or film openings 53, 56 and 60 respectively and are at such angles with respect to each other that their photographic vision through three openings in the front 12 of the camera box will cover a panoramic field, as shown in Fig. 2, in which one opening 93 for lens A is shown, the effect of lenses B and C through openings in the camera box being also shown in this figure, from which it will be observed that a field of 90° is covered by the use of three 30° lenses.

Between each film opening and each lens there is a shutter, the operation of which is as follows:—

A link 94 is pivotally attached to the gear 31 at 95 and to the arm 96 at 97. The arm 96 is fixedly attached to the rock-shaft 98 and carries a shutter 99 at its extremity.

Fixedly attached to the rock-shaft 98 is the member 100 carrying the shutter 101 (Fig. 6), and fixedly attached to the rock-shaft 98 is the member 102 carrying the shutter 103 (Fig. 5).

The oscillation of the rock-shaft 98 will therefore simultaneously open and close the shutters 103, 101 and 99 to the lenses A, B and C respectively.

From the above it will be seen that the rotation of the crank arm 18 will expose all three films simultaneously, close the three shutters simultaneously, feed the three films equally and simultaneously and again open the three shutters for the purpose of taking three pictures, all of these motions being automatic and accurate.

It is to be further noted that while three pictures are being made simultaneously, one upon each film, that they are not coincident upon each film, but on account of the angle of the three lenses they are adjacent pictures, the three being capable of being projected, side by side to make a complete uninterrupted wide field picture.

As the particular forms of lenses or shutters are not part of my invention, I have shown these elements in diagrammatic form, as it is evident that any lenses or shutters, which will produce the desired and described result, may be employed.

I do not limit myself to the particular size, shape, number or arrangement of parts as shown and described, all of which may be varied without going beyond the scope of my invention as shown, described and claimed.

What I claim is:—

1. In a moving-picture camera, in combination, a plurality of vertically disposed lenses having their optical axes divergent from each other and the inclination of which with respect to each other is such that the optical fields of said lenses abut throughout their length.

2. In a moving picture camera, in combination, a plurality of vertically disposed lenses having their optical axes divergent from each other and the inclination of which with respect to each other is such that the optical fields of said lenses abut throughout their length and do not cross each other.

3. In a moving picture camera, in combination, a plurality of lenses having their optical axes divergent from each other and the inclination of which with respect to each other is such that the optical fields of each other is such that the optical fields of each other is such that the optical fields of said lenses abut throughout their length, a film-gate for each lens, and means for simultaneously taking a series of pictures through the film-gates upon a plurality of films.

4. In a moving picture camera, in combination, a plurality of lenses having their optical axes divergent from each other and the inclination of which with respect to each other is such that the optical fields of said lenses abut throughout their length and do not cross each other, a film-gate for each lens, and means for simultaneously taking a series of pictures through the film-gates upon a plurality of films.

5. In a moving picture camera, in combination, a plurality of vertically disposed lenses having their optical axes divergent from each other and the inclination of which with respect to each other is such that the optical fields of said lenses abut throughout their length, a film-gate for each lens, and means for simultaneously taking a series of pictures through the film-gates upon a plurality of films.

6. In a moving picture camera, in combination, a plurality of vertically disposed lenses having their optical axes divergent from each other and the inclination of which with respect to each other is such that the optical fields of said lenses abut throughout their length, and do not cross each other, a film gate for each lens, and means for simultaneously taking a series of pictures through the film-gate upon a plurality of films.

7. In a moving picture camera, in combination, a plurality of lenses in vertical alinement with each other, the optical axes of the lenses diverging outwardly from each other, the optical fields of the lenses covering a complete extended horizontal field view, a film-gate for each lens, and means for simultaneously taking a series of moving pictures through the film-gates upon a plurality of films.

8. In a moving picture camera, in combination, a plurality of vertically disposed lenses the optical axes of which are divergent from each other, each lens being adapted to produce a separate negative of abutting portions of an extended horizontal field view.

Signed at New York city, in the county of New York and State of New York, this 22d day of March, 1919.

GEORGE W. BINGHAM.